United States Patent [19]

O'Neill

[11] 4,380,409
[45] Apr. 19, 1983

[54] CRIB BLOCK FOR ERECTING BIN WALLS

[76] Inventor: Raymond J. O'Neill, 3 Garmony Pl., Yonkers, N.Y. 10710

[21] Appl. No.: 293,165

[22] Filed: Aug. 17, 1981

[51] Int. Cl.³ .............................................. E02D 5/00
[52] U.S. Cl. ..................................... 405/273; 52/439; 405/284
[58] Field of Search ............... 405/272, 273, 274, 275, 405/281, 284, 285, 286; 52/428, 439

[56] References Cited

U.S. PATENT DOCUMENTS

| | | | |
|---|---|---|---|
| 1,909,539 | 5/1933 | Huntoon | 405/273 |
| 3,864,885 | 2/1975 | Muse | 52/439 X |
| 3,877,236 | 4/1975 | O'Neill et al. | 405/273 |
| 4,295,313 | 10/1981 | Rassias | 52/439 X |

FOREIGN PATENT DOCUMENTS 941626 2/1974 Canada ............................... 405/286

Primary Examiner—Dennis L. Taylor
Attorney, Agent, or Firm—Daley, Boettcher & Brandt

[57] ABSTRACT

A crib unit of heavy, rugged character and which is useable in erecting bin wall structures for various purposes such as sea walls, retaining walls, etc. The unit has a pair of spaced side walls with a connector arm extending between the side walls and joined thereto with merger segments, the merger segments being of laterally widening character to effect strengthening of the side walls to render same more resistive to bending. The crib unit when paired with a like unit encloses a bin space having a configuration which facilitates substantially uniformly distributing bin fill pressure acting against the crib unit structure defining the bin.

4 Claims, 9 Drawing Figures

CRIB BLOCK FOR ERECTING BIN WALLS

BACKGROUND OF THE INVENTION

It is known to construct from precast concrete blocks or crib units, various types of wall structures for a wide range of purposes. Thus, walls may be erected which serve as space barriers, sound barriers, retaining walls, sea walls, dams, flood control walls, bridge abutments and the like. In certain applications low or inconsequential wall loadings are encountered, as for example, a simple sound barrier structure. In other structures of this type, e.g., a sea wall backed by a substantial landside fill, severe loadings are expected and may be made even more pronounced by the presence of a vehicular roadway or railroad right of way constructed on the fill side adjacent the sea wall. In the last-mentioned example of wall structure, wave action exerts heavy loading on one side of the wall, whereas, very significant earth pressures act on the other side of the wall. Types of crib units or blocks as are known for use in such structures are not entirely satisfactory for such service, principally because they do not possess sufficient ruggedness or strength to resist the various force components applied thereto in service. Thus individual or even plural ones of the crib blocks can fail under loading as where a facing panel at one side of the wall and forming one element of the crib unit shears or fractures from the cross member connecting it with another panel at the other side of the wall. The Huntoon U.S. Pat. No. 1,909,539 discloses a type of crib block which would not be satisfactory for use in the heavy loadings situation discussed above. Such block includes a front stretcher piece and rear stretcher member joined by a cross-member or header. The stretcher members are each relatively thin and the rear stretcher is considerably shorter than the front. Further, the header is relatively narrow and meets in juncture with the stretchers in somewhat sharp juncture so that the cantilevering effect of horizontal transverse force components acting on the stretcher members is magnified lessening the likelihood that the stretcher members and especially those at the wall front side will successfully resist such loadings and thus leading to fracture of the stretcher members. Where fracture occurs, the wall structure is not only weakened, but in the instance of a seawall is opened to the sea and consequent washing away of the fill, if any, within the wall and an undermining of the landfill behind the seawall so that total wall destruction invariably follows.

The crib block disclosed in U.S. Pat. No. 3,877,236 is of a design which is satisfactory in respect of its use in erection of certain kinds of wall structures. While more than adequate for such uses it does have a drawback in respect of use in walls subject to the heaviest types of loadings. The side panels of such unit extend below and behind the side panels of crib blocks next below. Moreover, the side panels of the unit are connected with a connecting arm that is of lesser height than the side panels so that if a massive force, e.g., earth pressure at the landside of a sea wall acts in a manner tending to slide the entire sea wall, force transmitted by one block to a like block next below (which one block is hooked at its panel bottom behind the top of the block below) is in the form of a cantilevering force which can fracture the panel of the block below away from its connecting arm. Furthermore, this form of block does not readily and conveniently allow for its use in erecting a staggered or stepped wall.

It is desirable therefore that there be provided a crib unit or block which is of heavy, rugged precast concrete construction having particularly enhanced resistance to bending and fracture in the side walls thereof and which is so constructed to possess identical loading resistance characteristics at both sides thereof. Furthermore it is desirable that the crib unit be such as to define or enclose when placed in side-by-side adjacency with a like crib unit, a bin enclosure characterized by the bin laterally narrowing at least in the outer reaches thereof transversely remote from the longitudinal centerline of the bin to an extent that preferably the bin course in such outer reaches approaches a circular course to thereby uniformly distribute bin fill pressure acting against the crib unit bin defining structure.

SUMMARY OF THE PRESENT INVENTION

The present invention relates to an improved crib unit or crib block which can be employed in the erection of bin wall structures, such structures being employed for any one of the many purposes for which bin walls have been erected. The crib unit while particularly intended for application wherein heavy wall loadings are to be expected, such as in sea walls, trestle retainer walls and the like is of a design which gives flexibility for using same in erecting any type of wall. Its placement is effected without concern for on site orientation of the unit since it presents identical shape at both ends. The invention also provides an improved bin wall structure as such wherein fill pressures within the bins of the structure are substantially uniformly distributed against the retaining wall surfaces defining the bins and thus materially reducing the likelihood that such bin pressures could cause failure of any one or more units of which the wall is comprised.

In accordance with the present invention, the crib unit is a unitary precast, reinforced concrete component of substantially uniform thickness or vertical dimension, the component having a pair of spaced side walls of identical longitudinal expanse and a central connector arm extending between the side walls. The side walls each have an elongated outer vertical wall surface and transverse parallel arranged vertical edge surfaces, with such edge surfaces of one side wall being in planar alignment with those of the other side wall. The juncture of the connector arm with the side walls is effected with integral merger segments at the opposite ends of the connector arm which segments have a horizontal expanse defined by vertical merger segment side edges extending from the connector arm side edges to joinder with the inner ends of the respective side wall transverse edge surfaces, the said merger segment side edges following laterally widening courses. Such laterally widening courses are of identical geometry so that the respective side walls and associated merger segments are identically shaped but disposed in facing relation to each other and thereby providing the unit with identical characteristics of resistance to loading at both sides thereof. Moreover, the lateral widening of the merger segments to joinder with the respective side wall transverse edges thereof produces greatly enhanced property of resistance to bending or cantilevering of such side walls and merger segments relative to the connector arm and characterized by increasing transverse thickness of the side walls and merger segments from the longitudinal extremities thereof toward the transverse centerline of the unit. Thus horizontal cantilevering bending load components acting, e.g., against the end regions and particularly the longitudinal tip ends of the side walls are quite readily resisted without hazard of fracture of the side walls in the reaction zone constituted by transverse outwardly directed planar extensions of the connector arm side margins.

The laterally widening courses which the merger segment side edge surfaces follow may be linear, curvilinear or a combination of both as long as the four merger segment side edge surfaces present the required identical geometry. Where curvilinear courses are employed they conveniently can follow the form of an arc of a circle although other forms of curves including parabolic, elliptical and the like can be used.

To insure proper erection alignment of the cribbing units when used in constructing a wall therewith, each unit is provided with interlock means by which it is positionally locked to like units placed above and below each said unit. By use of such interlock means extending longitudinally of the units and hence of the the wall structure constructed therewith, the units comprising the wall constitute an effective unitary structure of a character such that massive loadings, e.g., earth pressures more readily could move the entire wall structure rather than cause failure of only one or a number of individual crib units within the wall structure.

As noted, the interlock means extends longitudinally of the crib unit preferably at both sides thereof and can be embodied along the side walls or along the merger segments. A preferred interlock means involves using projections extending vertically from the unit, e.g., at the bottom side thereof and grooves at the other side, i.e., at the top side or vice versa. Thus the grooves at the top side of one unit would receive the projections at the bottom side of a crib unit positioned above said one unit.

A further feature of the invention provides that the crib block can be modified to serve as an anchor block at the landfill side of a bin wall structure, such anchor blocks being in a lower horizontal course of the structure. Such anchor block is characterized by the feature that at least one of the side walls thereof, i.e., the one to be disposed at the rear side of the wall has a greater transverse reach than the first described embodiment of crib block. Such one side wall has an outer vertical wall surface defined by the sides of an isosceles triangle extending outwardly from the outer ends of the associated wall transverse edge surfaces. Optionally the isosceles triangle can be truncated with a planar wall surface part orthogonal to the side wall transverse edge surfaces. The extension of the side wall of the anchor block thus functions when buried deeply beneath the fill at the rear side of the wall structure to add stability to the wall to prevent tipping of the entire wall structure about a fulcrum point constituted by the lower front edge or toe of the wall structure. Thus the effect of softening of the soil underlying the toe which could promote tilting is offset by moving the gravity effect of the counterbalancing soil pressure more rearwardly in the wall structure relatively of the toe.

A further aspect of the invention provides that the crib unit is especially adapted for erection of bin wall structures wherein the bins are so configured to laterally narrow in a direction away from the longitudinal centerline of the bin at least along the outer reaches of the bin defining margin. Thus when a crib unit is placed in side-by-side adjacency into another like unit, the two define a bin enclosure of the aforesaid description, the lateral narrowing being demarked by the facing merger segment side edges of the two crib units. The narrowing of the bin provides for uniformly distributing the pressure of fill within the bin acting on the crib unit side walls.

The invention accordingly comprises the crib unit having the features of construction which will be exemplified in the construction hereinafter set forth and the scope of the invention will be indicated in the claims.

BRIEF DESCRIPTION OF THE DRAWINGS

A fuller understanding of the nature and objects of the present invention will be had from the following description taken in conjunction with the accompanying drawings in which.

Throughout the description, like reference numerals are used to denote like parts in the drawings.

DESCRIPTION OF THE PREFERRED EMBODIMENTS

Figure 4:
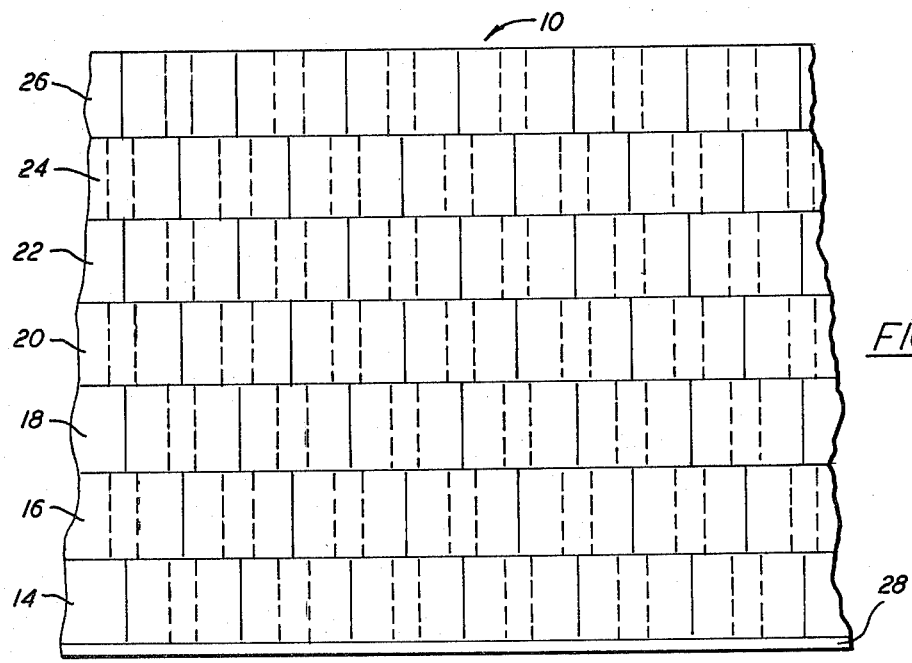
FIG. 4 is a front elevational view of a portion of a retaining wall constructed with cribbing units of the form depicted in FIGS. 1–3.
Figure 5:
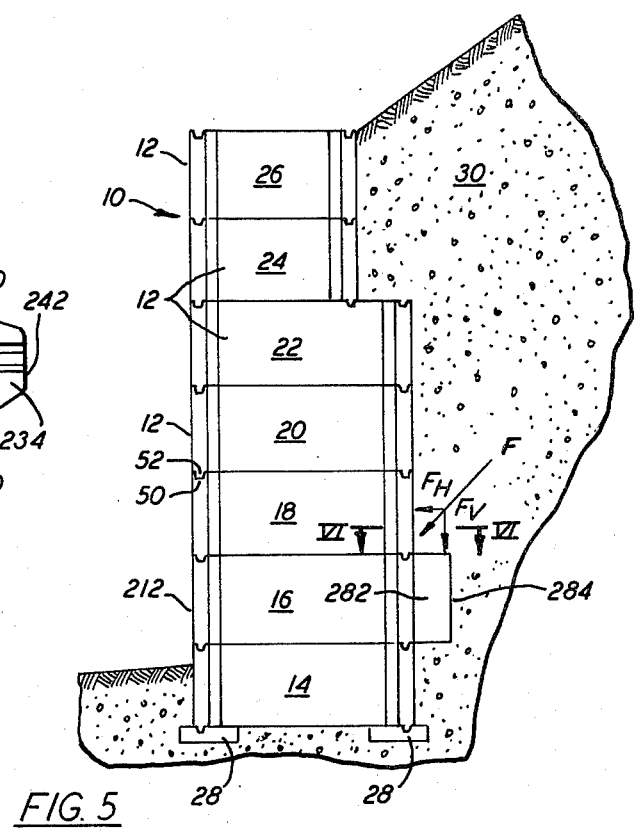
FIG. 5 is a side elevational view of the battered and stepped structure retaining wall depicted in FIG. 4 and illustrating employment therein of a further modified crib unit which can be employed at the rear side of the wall as an anchor unit.

FIGS. 4 and 5 depict a bin wall structure 10 erected with crib units 12 of the present invention, the bin wall being both a battered and staggered or stepped type wall. Thus, as best seen in FIG. 5, the wall is slightly inclined rearwardly and includes lower courses 14–22 on which have been placed upper staggered or stepped courses 24,26, the last-two courses being of lesser transverse dimension than the lower courses. Further, the wall structure is in conventional manner set on bearing pads or pillows 28. Wall 10 is, for example, a retaining type wall demarking a barrier side at the front and a large mass of earth 30 at the rear side. The front side could also hold back a water mass, in which case the wall would constitute a seawall. As shown in FIG. 4, the various courses 14–26 of crib units are each comprised of a plurality of longitudinally disposed, side-by-side placed crib units 12, the units of any given course being longitudinally staggered with respect to the positioning of the units in the courses next above or below. In the depicted wall 10, the respective individual crib units 12 each have a longitudinal expanse or length of 4 feet, a vertical dimension or height of 3 feet and a transverse dimension or depth of 8 feet in courses 14,16,18,20 and 22 and of 6 feet in courses 24,26. Course 16 includes a further feature of crib block to be described in detail later and directed to utilization of such block as an anchor member. The crib units are in each case reinforced concrete components in which the steel reinforcing members are buried at least 3 inches from the block outer surfaces.

Figure 1:
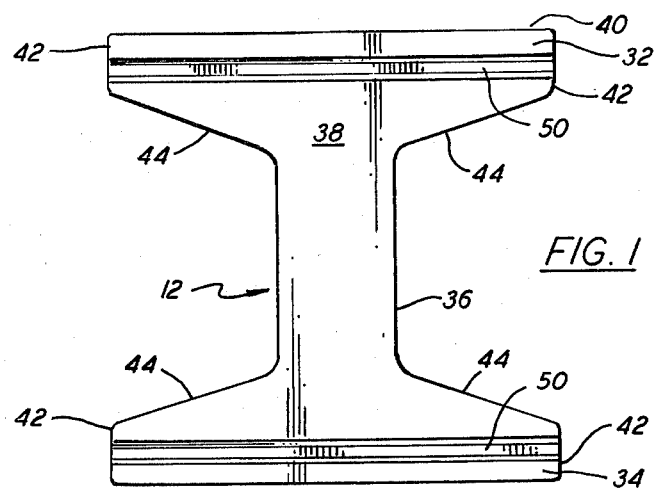
FIG. 1 is a plan view of one form of cribbing unit constructed in accordance with the principles of the present invention.
Figures 2, 3:
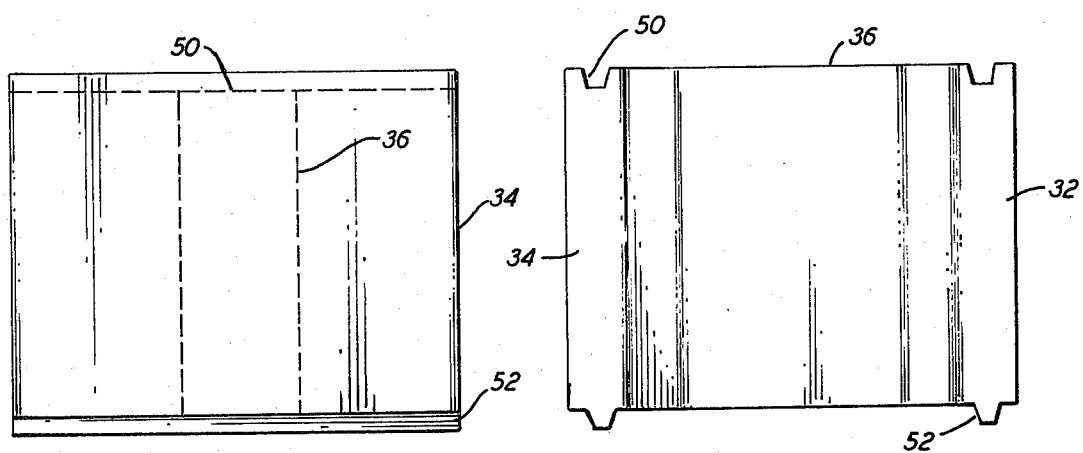
FIG. 2 is a front elevational view of the unit shown in FIG. 1
FIG. 3 is a side elevational view of the same.

Referring now to FIGS. 1–3, there is shown one embodiment 12 of crib unit made in accordance with the present invention. The crib unit 12 is as mentioned, a precast, reinforced concrete component which may either be fabricated at a central location or be cast at the job site. The crib unit 12 includes a pair of spaced side walls 32,34 of the same longitudinal expanse, and a centrally disposed connector arm 36 extending between the side walls, the ends of the connector arm 36 having juncture with the respective side walls 32,34 by means of merger segments 38. Each side wall has an outer vertical wall surface 40 and transverse parallel arranged edge surfaces 42 at either end with the edge surfaces 42 of one side wall in planar alignment with those of the other. The merger segments 38 are further characterized by their horizontal expanse being defined by merger segment side edges 44 which extend from the connector arms to joinder with the inner ends of side wall transverse edge surfaces 42 and following laterally widening courses from the connector arms toward the side walls. Such laterally widening courses in each instance are of identical geometry providing that the side walls and merger segments of the unit are identically shaped but disposed in facing relation. Thus both sides of each crib unit present identical resistance to loading components applied thereto whether from one side of the wall or the other. Further the transverse thickness of each side wall and its associated merger segment from the longitudinal extremities thereof increase toward the transverse centerline of the unit to correspondingly increase the resistance thereof to transverse bending loads to thereby insure withstanding any transversely directed horizontal cantilevering forces expected to be applied to the units.

Figure 7:
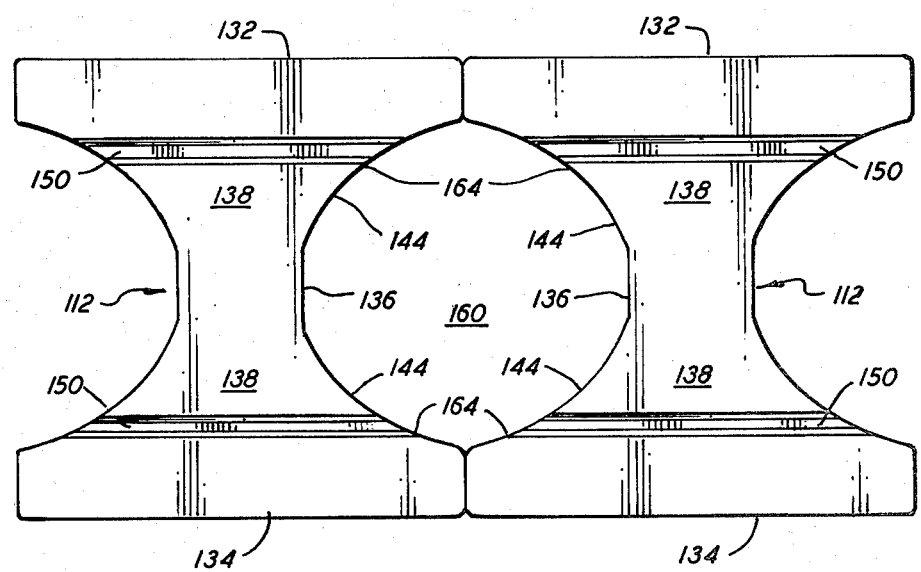
FIG. 7 is a plan view of another embodiment of crib unit in which the merger segment side edges follow curvilinear courses, there being depicted a pair of such units arranged in side-by-side alignment so as to define a crib space therebetween.

The laterally widening courses which the merger segment side edges follow can be linear or curvilinear or a combination of both, representative of such options being the arrangements shown in FIGS. 1 and 7. Where curvilinear courses are followed they can be elliptical, parabolic etc., although arcs of a circle are preferred.

In erecting the wall 10, the crib units 12 in the respective courses are interlocked to provide in effect a single unitary wall structure. In accordance with the invention, the interlock means should extend longitudinally of the crib unit and be effective for a substantial longitudinal distance thereon to provide for the most effective interconnection of the respective units with others both above and below any given unit. The interlock means preferably is provided as a combination of projections and grooves formed in the upper and lower faces of the unit 12. Thus as shown in FIGS. 1–3, grooves 50 can be formed, e.g., in the unit upper face at both the front and rear sides and projections 52 can extend vertically downward from the bottom face. In this instance the projections on any given block would interlock with the grooves of a block below, and the projections extending from a block above would be received in the grooves 50 of such block. The interlock means of grooves and projections can be disposed along the length of the side walls 32,34 as shown in FIGS. 1–3 but spaced inwardly a distance from the outer vertical wall surfaces 40. Alternatively, the interlock means can be formed in the merger segments 138 (FIG. 7), and also in the connector arms, where stepped walls are constructed and units of different transverse depths are laid one on top of another.

Figure 6:
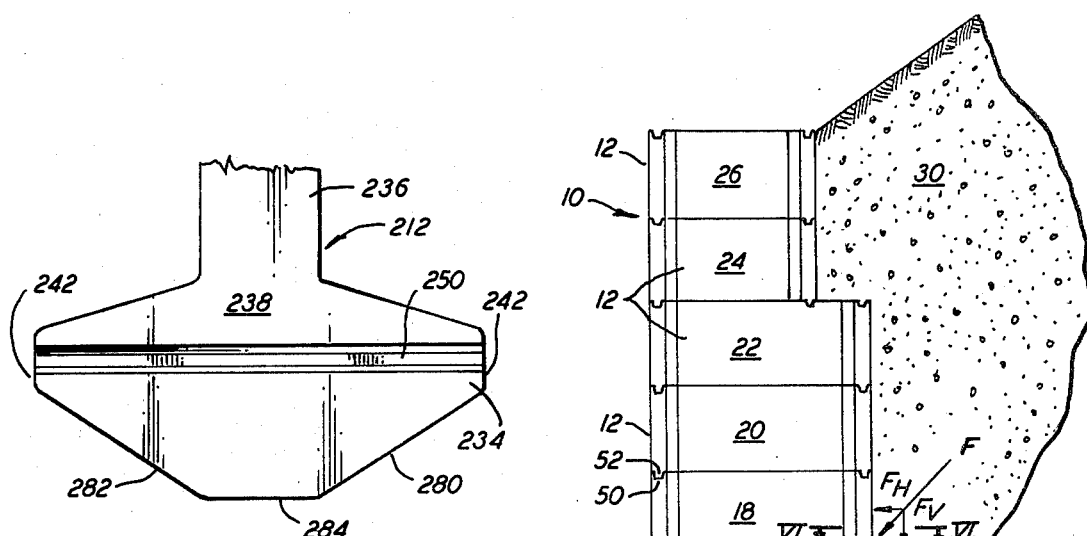
FIG. 6 is a fragmentary enlarged plan view as taken along the arrows VI—VI in FIG. 5.

As was noted earlier, the present invention provides a modified form of crib unit 212 of the type shown in FIGS. 5 and 6 which is laid in as a lower course of the wall 10 to serve as an anchor to increase wall stability. Crib unit 212 is like that previously described except that at one side, i.e., the wall rear side, the unit is transversely elongated to provide structure extending into and under the mass to fill 30 so that the force F exerted by the fill works with the vertical component F thereof to apply a counterbalancing force to the entire wall tending to overcome any toppling or tilting force trying to pivot the wall frontally about the toe thereof. This force component acts on the rearwardly extending part of the unit 212. In this unit the vertical wall surface of the rear side wall is defined by the sides 280, 282 of an isoceles triangle extending outwardly from the outer ends of the wall transverse edges 242. The triangle may be truncated as with a planar wall surface part 284 orthogonal to edges 242 with the effect nonetheless that there is provided a relatively broad expansive surface underlying and receptive of the fill load noted above to serve the purpose described above.

FIG. 7 shows the manner in which two crib units 112 when placed in side-by-side adjacency define a bin 160 therebetween, such bin being filled with fill such as earth, crushed stone, etc. to add stability to a wall structure. Such fill also exerts pressure on the crib units structure or surfaces defining the bin. The present invention provides that the connector arms and side walls are so configured that at least in the outer reaches of the bin (as at 164) transversely remote from the bin longitudinal centerline, the circumscribed course of the bin approaches that of a circle so as to substantially uniformly distribute the pressure exerted by the fill against the structure defining such circumscribed course. In this manner no concentration of excessive pressure can occur at any given location within the bin.

Figure 8:
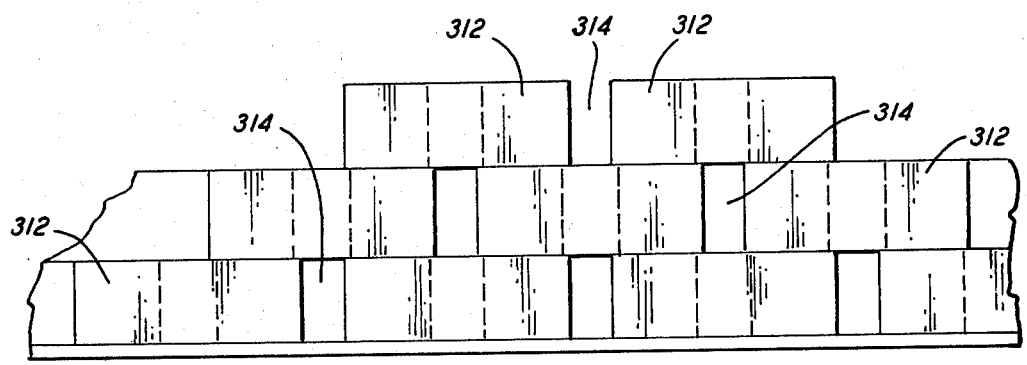
FIG. 8 is a front elevational view showing several vertical courses of a retaining wall in which the crib units in each course are longitudinally spaced one from another.
Figure 9:
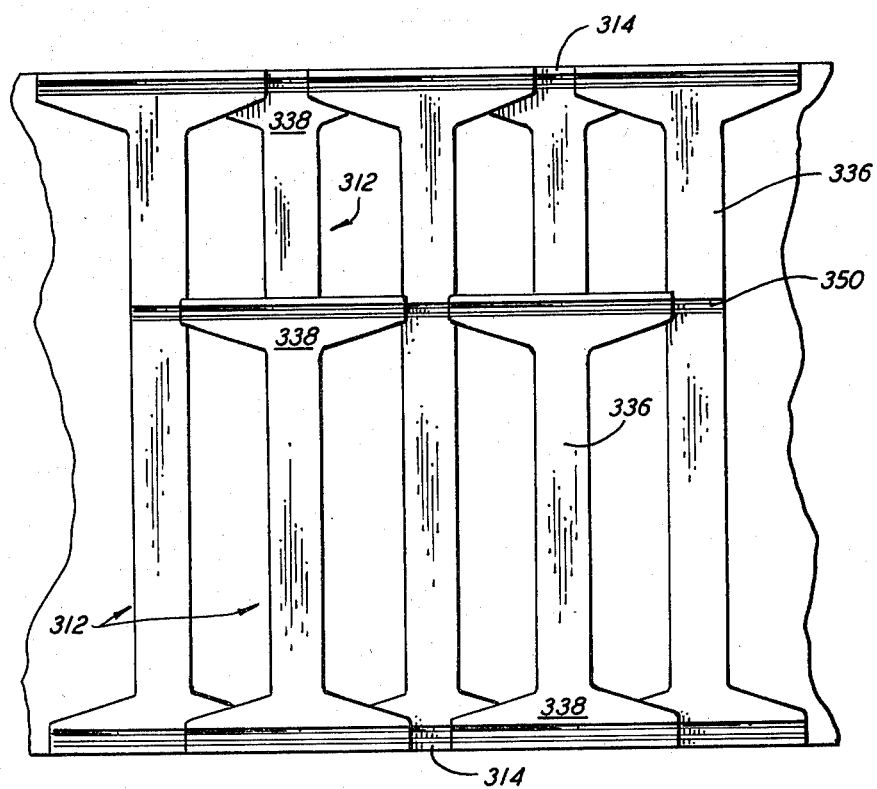
FIG. 9 is a fragmentary plan view of the wall courses shown in FIG. 8.

The crib units of the present invention are particularly suited for erecting a bin wall of considerable length and wherein it is desired to conserve the quantity of concrete which must be employed for such purpose. To this end and as shown in FIGS. 8 and 9, the crib units 312 in the respective courses of which the wall will be comprised can be longitudinally spaced a distance one from the next as at 314 without materially effecting the overall strength and stability of the wall structure. The units in each successive course are staggered or longitudinally displaced relative to those of courses above and below and are interlocked in the manner described earlier with reference to the wall 10 (FIGS. 4 and 5). Stone fill generally will be placed in the bin of this type structure. By way of example, the lower two courses shown in FIGS. 8 and 9 are comprised of crib units 4 feet long, 3 feet high and 12 feet deep. The third course which starts the stepping of the wall is 8 feet deep and the 12 foot units have interlock grooves 350 found in the connector arms 336 to receive the projections at the underside of the 8 foot units.

From the foregoing description, it will be seen that the crib unit of the present invention offers a number of important improvements over prior crib blocks. It is of relatively massive construction, possesses a high degree of strength resistive of the forces encountered in bin walls, both from soil pressure, bin fill pressure and other forces such as wave pressure in the case of a sea wall structure. While in most cases it is expected that the severest wall loadings will occur at the wall rear side and walls are thus constructed with such loadings in mind and emphasis on the rear side strength and structure, there are times when equally severe front wall loads can occur. Thus in a situation where a flood occurs and submerges a bin wall, the fall of the water or drawdown exerts tremendous pressures at the wall front side tending if possible to pull the crib units frontally from the wall. The wall of the present invention by reason of its identical front and rear wall side strength characteristics is ideally suited to withstand such loading.

What is claimed is:

1. A cribbing unit for use in erecting bin wall structures of the type wherein horizontal courses of aligned ones of such units are laid on top of another to establish the structure and enclose bins therein, said unit comprising as a unitary precast component of substantially uniform vertical thickness, a pair of spaced side walls of equal longitudinal expanse and each having an outer vertical wall surface and transverse parallel arranged edge surfaces with the edge surfaces of one wall being in planar alignment with those of the other wall, and a central connector arm extending between said side walls, the juncture of said connector arm with each side wall being characterized by merger segment side edges extending from the connector arm to the side walls which follow laterally widening, at least in part curvilinear courses to joinder thereof with the inner ends of the transverse edge surfaces of the respective side walls, the said merger segment side edges traversing courses of identical geometry whereby each side wall and associated merger segment is identically shaped but disposed in facing relation to the other thereby to provide such unit with identical characteristics of resistance to loading at both sides of said wall, with the transverse thickness of the side walls and merger segments from the longitudinal extremities thereof increasing toward the transverse centerline of the unit to correspondingly increase the resistance thereof to transverse bending loads applied thereto.

2. The cribbing unit of claim 1 in which the curvilinear course followed by the merger segment side edges is the arc of a circle.

3. The cribbing unit of claim 1 in which the outer vertical wall surfaces of the side walls are planar and parallel arranged.

4. In a bin wall structure of the type wherein horizontal courses of longitudinally aligned cribbing units are laid one on top of another to establish the structure, with the cribbing units each comprising a pair of spaced side walls and a connector arm extending between the side walls so that the connector arms and side walls of a pair of adjacently disposed cribbing units in a given course enclose a fill receptive bin space therebetween, the improvement wherein the bin defining surfaces of the connector arms and the side walls of said cribbing units are configured such that at least in the outer reaches of the bin transversely remote from the longitudinal centerline thereof, the circumscribed course thereof approaches that of a circle to thereby substantially uniformly distribute bin fill pressure against the structure defining such circumscribed course.

* * * * *